Aug. 18, 1959 K. J. DANGERFIELD 2,900,126
CENTRIFUGAL COMPRESSORS
Filed Aug. 18, 1954 3 Sheets-Sheet 3
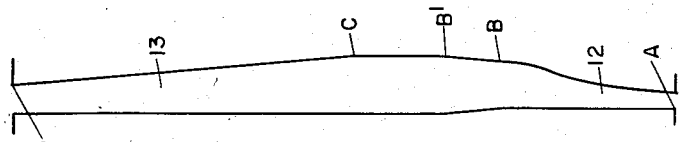
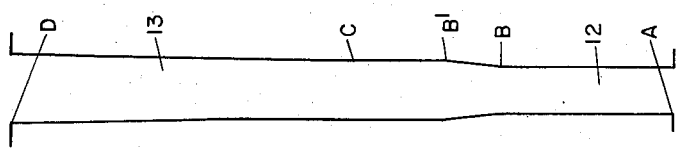
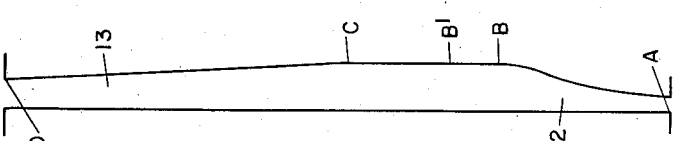
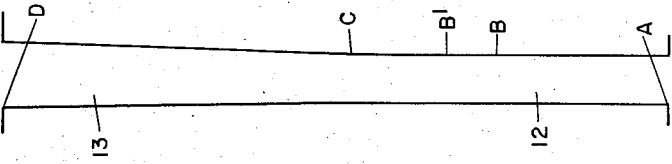
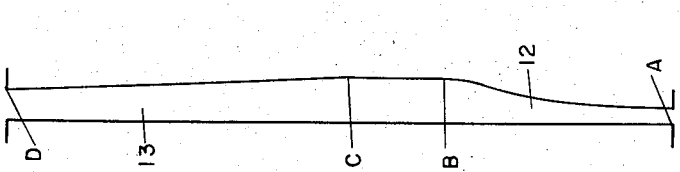
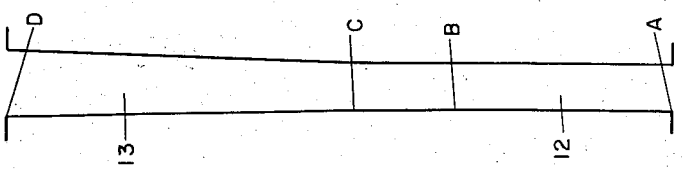
INVENTOR
KENNETH J. DANGERFIELD
BY
ATTORNEY United States Patent Office
2,900,126
Patented Aug. 18, 1959

2,900,126

CENTRIFUGAL COMPRESSORS

Kenneth J. Dangerfield, Selly Oak, Birmingham, England, assignor to The Austin Motor Company Limited, Birmingham, England Application August 18, 1954, Serial No. 450,740

Claims priority, application Great Britain August 29, 1953

5 Claims. (Cl. 230—130)

This invention relates to centrifugal compressors.

In the usual type of vaned diffuser of a centrifugal compressor, the diffuser passages extend radially outwardly from the periphery of the impeller, and increase progressively in cross-sectional area from the inlet or throat ends to the outlet ends, this increase in area being due to increase in the width dimension of the passages, in the transaxial plane of the impeller, resulting from the divergence of adjacent diffuser vanes between the parallel transaxially disposed walls of said passages. Where mass flow of air is low in relation to rotational speed of the impeller, the diffuser passage inlet openings of necessity are of elongated form, the greater dimension being in width in the transaxial direction, and since the depth dimension of the passages, in the axial plane of the impeller, is constant throughout their length and the diffuser vanes diverge, this greater transaxial width dimension increases progressively, so that the passage outlets are of even more pronounced elongated form than the inlets and are of high perimeter to area ratio with consequently large "boundary layer" effects. Moreover the rapid divergence of the diffuser vanes renders the direction of air flow at the outlets of the diffuser passages somewhat indefinite.

In a multi-stage centrifugal compressor as hitherto constructed, the air leaving the diffuser passage outlets of one stage usually enters an annular manifold afforded by the surrounding casing whilst a flow reversal from radially outward to radially inward flow occurs, and during the radially inward flow it is picked up by fixed vanes which remove the whirl velocity before the air enters the inlet or eye of the next stage.

A centrifugal compressor according to the present invention is characterised in that at least the inlet end portions of the diffuser passages progressively increase in cross-sectional area from the inlet with progressive reduction in the ratio of the transaxial width to axial depth, resulting in a section with a more favorable ratio of perimeter to area.

The progressive increase in cross-sectional area may be attained by progressively increasing the axial depth dimension of the passages, while maintaining the transaxial width dimension substantially constant.

The progressive increase of the axial depth dimension of the passages preferably is carried to a point in the passages where the said depth and width dimensions are substantially equal, and the ratio of said dimensions becomes a minimum, that is unity. Said point may coincide with the passage outlets, or may be before the outlets, in which case said minimum ratio would be maintained up to the diffuser passage outlets, with or without further increase in the cross-sectional area.

In a further feature of the invention each diffuser passage outlet communicates with a separate return duct, which return duct reverses the radial direction of air flow and delivers its complement of air to an inlet eye of a second stage impeller.

An embodiment of the invention will now be described with reference to the accompanying drawings, in which:

Figs. 3 and 4 are development diagrams, each showing one diffuser passage and return flow duct, in cross-sectional planes at right angles to each other, Fig. 3 being in a transaxial plane, and Fig. 4 in an axial plane, of the compressor impeller.

Figs. 5 and 6 are similar views to Figs. 3 and 4, but illustrate a modified construction of diffuser passage.

Figs. 7 and 8 are also similar views to Figs. 3 and 4, illustrating a further modified construction of diffuser passage.

Figure 1:
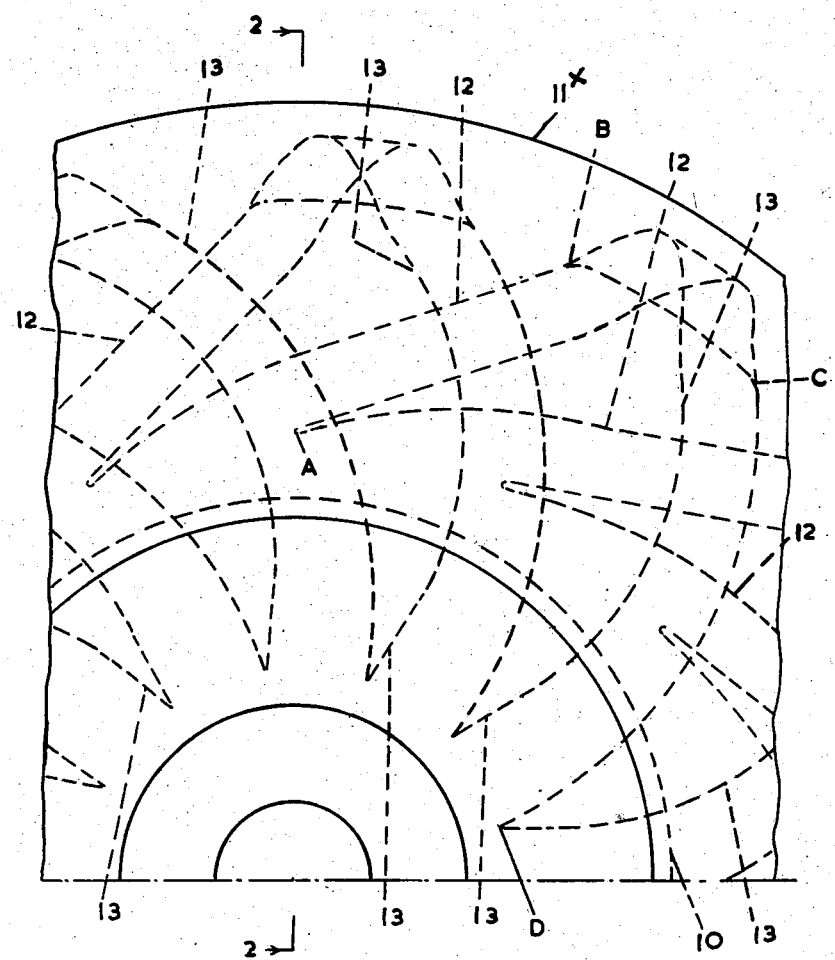
Fig. 1 is a fragmentary diagrammatic front elevation of a multi-stage centrifugal compressor.

In Fig. 1, it will be appreciated that constructional details have been omitted in order to show clearly the outline only of diffuser passages and return flow ducts of the first stage.

Referring to Figs. 1 to 4 of the drawings, the centrifugal compressor comprises a first-stage impeller 10 mounted on a driving shaft 11, and a casing structure 11$^x$ the internal construction of which affords radially outwardly extending diffuser passages, indicating generally by the reference numeral 12, and radially inwardly extending return flow ducts 13.

Figure 2:
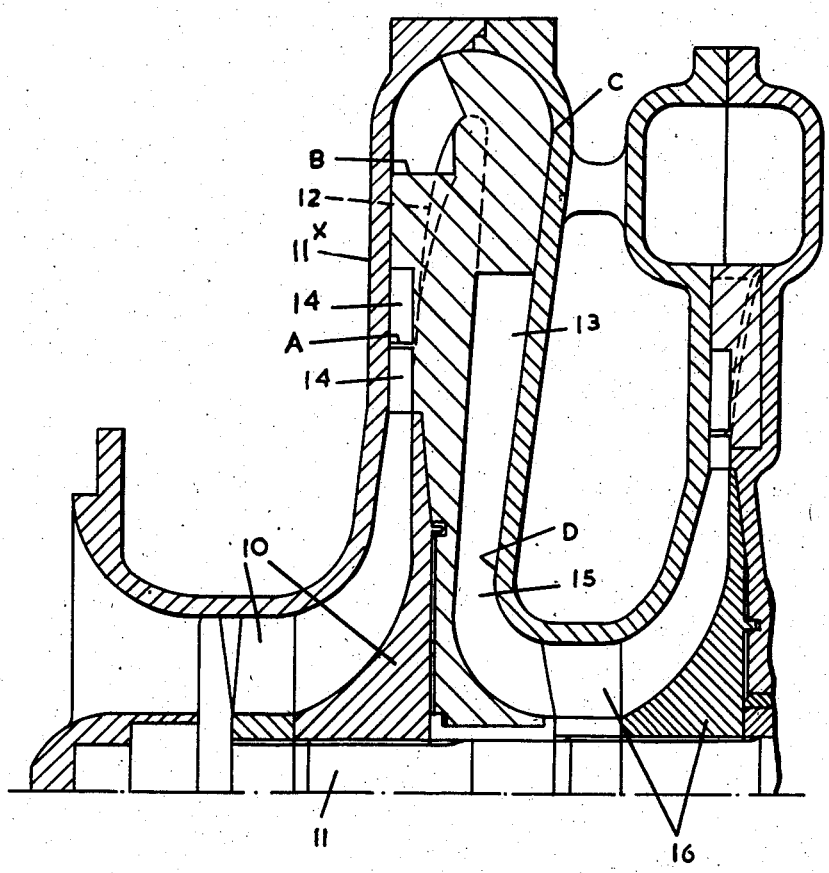
Fig. 2 is a cross-sectional elevation on the line 2—2 of Fig. 1.

Both the diffuser passages 12 and the return flow ducts 13 are of rectangular cross-section throughout as clearly indicated in Figs. 3 and 4, and also in Fig. 2 where the inlet portions or throats of two diffuser passages 12 can be seen at 14.

Referring particularly to Figs. 1, 3, and 4 the inlet or throat end A of the passages 12 are of elongated rectangular form, the transaxial depth dimension (Fig. 3) being greater than the axial depth dimension (Fig. 4). From the inlet or throat A up to point B, which coincides with the outlet of the diffuser passage 12, there is a progressive increase in the axial depth dimension of the passage as indicated in Fig. 4, while the transaxial width dimension remains constant as indicated in Fig. 3, and at the diffuser outlet point B these dimensions are equal, so that the passage 12 is of square shape in cross-section. The square cross-sectional shape gives the minimum perimeter to area ratio, with consequent minimum "boundary layer" effect.

For more rapid diffusion in the same length of diffuser passage, the alternative construction illustrated diagrammatically in Figs. 5 and 6 would be employed, in which the point B is located before the diffuser passage outlet B$^1$. Between these points the passage is square in cross-section.

In the further alternative construction illustrated diagrammatically in Figs. 7 and 8, the point B at which the minimum perimeter to area ratio is obtained in again located before the diffuser passage outlet B$^1$, but both the width and depth dimension of the passage increase equally from the point B up to the outlet B$^1$, which provision maintains the minimum perimeter to area ratio of the passage and provides further diffusion.

Referring again to Figs. 1–4 of the drawings the diffuser passages 12 each communicate with a separate return duct 13, the first portion of which extends from the diffuser passage outlet B to the point C and is of constant cross-sectional area, and in which portion of the return duct 13 the air flow is reversed from radially outward to radially inward flow, the remaining portion of each return duct 13 from the point C to the outlet D, conveying the air in radially inward direction to the eye 15 of the second stage impeller 16.

From the point C to the outlet D the return ducts 13 decrease progressively in the axial width dimension, until, as can be clearly seen in Figs. 1 and 2, the sum of the areas of outlets D of these return ducts 13 equals the area of the inlet eye to which they discharge.

In Figs. 5, 6 and 7, 8, the section of the return duct from B¹ to C is of constant cross-sectional area, and the section C to D is of the same form as the section C to D of Figs. 1–4.

The invention provides a centrifugal compressor in which boundary layer effects in the diffuser will be reduced as a result of the development of the diffuser passages so as to afford increasing cross-sectional area with reducing perimeter to area ratio, and which will give an improved control of the direction of flow at the diffuser outlets. As applied to a multi-stage compressor, the provision of separate return or delivery ducts for the respective outlets of the diffuser, as above described, eliminates losses at the diffuser outlets and at entry to the usual inter-stage vanes and also beneficially effects the diffuser efficiency.

Having fully described my invention, what I claim and desire to secure by Letters Patent is:

1. In a centrifugal compressor having diffuser passages with throats of elongated rectangular form with the greater dimension in the transaxial width direction, progressively increasing the cross-sectional area of the inlet end portion of each passage by progressively increasing the axial depth dimension of the passage while maintaining the transaxial width dimension substantially constant, up to a point intermediate the ends of said passage at which the said depth and width dimensions are substantially equal and the cross-sectional shape of the passage is square, and maintaining said cross-sectional shape up to the outlet of the passage.

2. In a centrifugal compressor having diffuser passages with throats of elongated rectangular form with the greater dimension in the transaxial width direction, progressively increasing the cross-sectional area of the inlet end portion of each passage by progressively increasing the axial depth dimension of the passage while maintaining the transaxial width dimension substantially constant, up to a point intermediate the ends of said passage at which the said depth and width dimensions are substantially equal and the cross-sectional shape of the passage is square, and maintaining said cross-sectional shape up to the outlet of the passage, without further increase of said dimensions.

3. In a centrifugal compressor having diffuser passages with throats of elongated rectangular form with the greater dimension in the transaxial width direction, progressively increasing the cross-sectional area of the inlet end portion of each passage by progressively increasing the axial depth dimension of the passage while maintaining the transaxial width dimension substantially constant, up to a point intermediate the ends of said passage at which the said depth and width dimensions are substantially equal and the cross-sectional shape of the passage is square, and maintaining said cross-sectional shape up to the outlet of the passage with further progressive increase of said dimensions.

4. A centrifugal air compressor having diffuser passages of rectangular cross section throughout their length, characterised in that the inlet end of each diffuser passage is of elongated rectangular cross section with the greater dimension of the latter disposed transaxially, the transaxial dimension of the passage cross section being constant throughout the length of said passage and the axial dimension of said passage cross section progressively increasing from the inlet end up to a point at which it is equal to the constant transaxial dimension so that the perimeter to area ratio becomes a minimum, the cross section at said point being substantially square.

5. A centrifugal air compressor having diffuser passages of rectangular cross section throughout their length, characterised in that the inlet end of each diffuser passage is of elongated rectangular cross section with the greater dimension of the latter disposed transaxially, the transaxial dimension of the passage cross section being constant throughout the length of said passage and the axial dimension of said passage cross section progressively increasing from the inlet end up to a point coincident with the diffuser passage outlet at which it is equal to the constant transaxial dimension so that the perimeter to area ratio becomes a minimum, the cross section at said point being substantially square.

References Cited in the file of this patent

UNITED STATES PATENTS

| | | |
|---|---|---|
| 687,852 | Richards | Dec. 3, 1901 |
| 984,189 | Brown | Feb. 14, 1911 |
| 1,496,633 | Hertzler | June 3, 1924 |
| 2,596,646 | Buchi | May 13, 1952 |
| 2,708,883 | Keller et al. | May 24, 1955 |

FOREIGN PATENTS

| | | |
|---|---|---|
| 450,491 | Germany | Oct. 11, 1927 |
| 891,741 | France | Dec. 17, 1943 |
| 983,370 | France | Feb. 7, 1951 |